United States Patent
Ueda

[11] Patent Number: 6,151,989
[45] Date of Patent: Nov. 28, 2000

[54] BICYCLE CLEAT

[75] Inventor: Yutaka Ueda, Tondabayashi, Japan

[73] Assignee: Shimano Inc., Osaka, Japan

[21] Appl. No.: 09/346,546

[22] Filed: Jul. 2, 1999

Related U.S. Application Data

[62] Division of application No. 09/186,146, Nov. 5, 1998.

[51] Int. Cl.$^7$ ................................................ B62M 3/08
[52] U.S. Cl. .................................... 74/594.6; 36/131
[58] Field of Search .............................. 74/594.6; 36/131

[56] References Cited

U.S. PATENT DOCUMENTS

| | | | |
|---|---|---|---|
| 4,686,867 | 8/1987 | Bernard et al. | 74/594.6 |
| 4,762,019 | 8/1988 | Beyl | 74/594.6 |
| 4,827,797 | 5/1989 | Le Faou et al. | 74/594.6 |
| 4,928,549 | 5/1990 | Nagano | 74/594.6 |
| 5,003,841 | 4/1991 | Nagano | 74/594.4 |
| 5,060,537 | 10/1991 | Nagano | 74/594.6 |
| 5,195,397 | 3/1993 | Nagano | 74/594.4 |
| 5,203,229 | 4/1993 | Chen | 74/594.6 |
| 5,423,233 | 6/1995 | Peyre et al. | 74/594.6 |
| 5,497,680 | 3/1996 | Nagano | 74/594.6 |
| 5,505,111 | 4/1996 | Nagano | 74/594.6 |
| 5,755,144 | 5/1998 | Ueda | 74/594.6 |
| 5,778,739 | 7/1998 | Takahama | 74/594.6 |
| 5,802,930 | 9/1998 | Chen | 74/594.6 |
| 5,852,955 | 12/1998 | Crisick et al. | 74/594.6 |
| 5,852,956 | 12/1998 | Chen | 74/594.6 |

FOREIGN PATENT DOCUMENTS

| | | |
|---|---|---|
| 826589A | 3/1998 | European Pat. Off. . |
| 4215584 | 8/1992 | Japan . |

OTHER PUBLICATIONS

European Search Report; Application No. 99 30 8768; Six (6) pages; May 18, 2000.

*Primary Examiner*—Mary Ann Green
*Attorney, Agent, or Firm*—Shinjyu Global IP Counselors, LLP

[57] ABSTRACT

A bicycle pedal assembly is provided for attaching a shoe thereto via a cleat. The bicycle pedal has a pedal body rotatably coupled to the second end of the pedal shaft for supporting a cyclist's foot. The pedal body preferably has a pair clamping members pivotally coupled thereto. A biasing member is coupled between the pedal body and each of the clamping members. Adjustment member or screw 231 is threaded into a threaded hole formed in the pedal body such that the free end of the screw contacts a portion of the associated clamping member to rotate the clamping member. The associated biasing member is now placed under tension. This arrangement allows for easy assembly of the bicycle pedal, since clamping members and biasing members can be coupled to pedal body without placing biasing members under tension. Also, this arrangement allows the initial tension to be regulated by utilizing thin washers between the head of the screws and the pedal body. A tension adjustment mechanism is also provided for each clamping member to vary the biasing force of the respective biasing members after the pedal is assembled.

19 Claims, 12 Drawing Sheets

BICYCLE CLEAT

CROSS-REFERENCE TO RELATED APPLICATION

This application is a divisional application of Applicant's copending U.S. patent application No. 09/186,146, filed on Nov. 5, 1998.

BACKGROUND OF THE INVENTION

1. Field of the Invention

This invention generally relates to a bicycle pedal. More specifically, the present invention relates to a clipless or step in bicycle pedal.

2. Background Information

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal the cleat engagement mechanism front and rear cleat clamping members that are fixed on both sides of the pedal body for engaging front and rear portions of a cleat. Road racing pedals typically only has a cleat engagement mechanism on one side of the pedal body. In either case, in this type of bicycle pedal, the rider steps onto the pedal and the cleat engagement mechanism automatically grips on to the cleat secured to the bottom of the cyclist's shoe.

More specifically, when attaching the cyclist's shoe to the step-in pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

When step-in pedals are used for road type bikes, the pedal is typically only provided with a single clamping assembly such that the cyclist's shoe can only be coupled to one of the two sides of the pedal. Off road or mountain type bikes, on the other hand, usually have a pair of clamping assemblies such that the cyclist's shoe can be clamped to either side of the pedal. In either case, it is desirable to design the pedal to be as compact and lightweight as possible.

One problem with most clipless pedals is that they are quite small such that only small portions of the pedal body engage the rider's shoe. Specifically, the pedal body has a tread surface located on both sides of the cleat engagement mechanism. This tread surface has only a small surface area because the pedal body is typically made as small as possible so that it will be lightweight. With this type of clipless pedal, the shoe and the pedal are in a state of constant engagement when the cleat clamping is engaged in the cleat clamping members, so the pedaling force can be transmitted efficiently to the pedals. As a result, clipless pedals are widely employed on racing bicycles used in road racing and mountain bike racing.

With this type of clipless pedal, if the shoe and the pedal are loose to the right and left around the cleat clamping members, then the rider's foot will wobble to the right and left and the rider's pedaling force will not be transmitted efficiently to the pedal. Therefore, any looseness to the right and left between the shoe and pedal should be suppressed to a minimum by having the rubber portion of the shoe sole come into contact on the right and left of the cleat with a tread surface provided to the pedal body.

The conventional structure described above merely consists of bringing the rubber portion of the shoe sole into contact with a tread surface having a tiny surface area in order to suppress looseness to the right and left of the shoe. Therefore, the contact length is minimal, and it is difficult to suppress properly the looseness to the right and left. Moreover, since the portion of the shoe sole that is in contact with the tread surface is the same portion that comes into contact with the ground when the rider is walking, it tends to wear down, and when this portion of the sole wears down, the tread surface and the shoe sole no longer come into contact uniformly, making it difficult to suppress the looseness between the shoe and pedal.

Downhill races, dual slalom races, cross-country races, and other such off-road races for mountain bikes and BMX (bicycle motocross) have been widely staged in recent years. In this type of off-road race, unlike in road racing, the riders traverse an unpaved track. Furthermore, with this type of off-road racing the foot must be repeatedly taken off the pedal during cornering and replaced on the pedal after the corner has been exited. Unfortunately, since the racing is performed on unpaved roads, mud clings to the pedals and tends to clog the cleat clamping members. Once the cleat clamping members become clogged with mud, the cleat cannot be engaged in the cleat clamping members, and the shoe cannot be attached to the pedal. Moreover, the mud often clogs the biasing mechanism such that the clamping members may not operate properly.

In view of the above, there exists a need for a bicycle pedal which overcomes the above mentioned problems in the prior art. In view of the above, it is apparent that there exists a need for a clipless bicycle pedal which works well in dirty and muddy environments. This invention addresses these needs in the art, along with other needs, which will become apparent to those skilled in the art once given this disclosure.

SUMMARY OF THE INVENTION

One object of the present invention is to provide a bicycle pedal, which works well in dirty and muddy environments.

Another object of the present invention is to provide a bicycle pedal that supports the cleat above the pedal body.

Another object of the present invention is to provide a bicycle pedal with a cover overlying the adjustment mechanism.

Another object of the present invention is to provide a bicycle pedal that is relatively lightweight.

Another object of the present invention is to provide a bicycle pedal that is relatively inexpensive to manufacture.

The foregoing objects of the present invention can be attained by providing a bicycle pedal assembly for attaching a shoe thereto via a cleat, comprising a pedal shaft having a first end for attachment to a bicycle crank and a second for supporting a cyclist's foot a pedal body rotatably coupled to the second end of the pedal shaft, the pedal body having a first end and a second end; a first clamping member pivotally coupled to the first end, the first clamping member having a first cleat engagement surface facing in a first direction and a second cleat engagement surface facing in a second direction which is substantially opposite to the first direction; and a second clamping member coupled to the second end, the second clamping member having a third cleat engagement surface.

The foregoing objects can further be attained by providing a bicycle shoe cleat for releasably coupling a shoe to a bicycle cleat, the bicycle shoe cleat comprising an attachment portion having a first end, a second end, an upper sole side facing in a first direction and a lower pedal side facing in a second direction which is substantially opposite to the first direction; a first coupling member extending from the first end, the first coupling member having a first coupling surface and a second coupling surface, the first coupling surface facing in substantially the first direction and being located between upper sole side and a lower pedal side, the second coupling surface facing in substantially the second direction; and a second coupling member extending from the second end and having a third coupling surface facing in the first direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
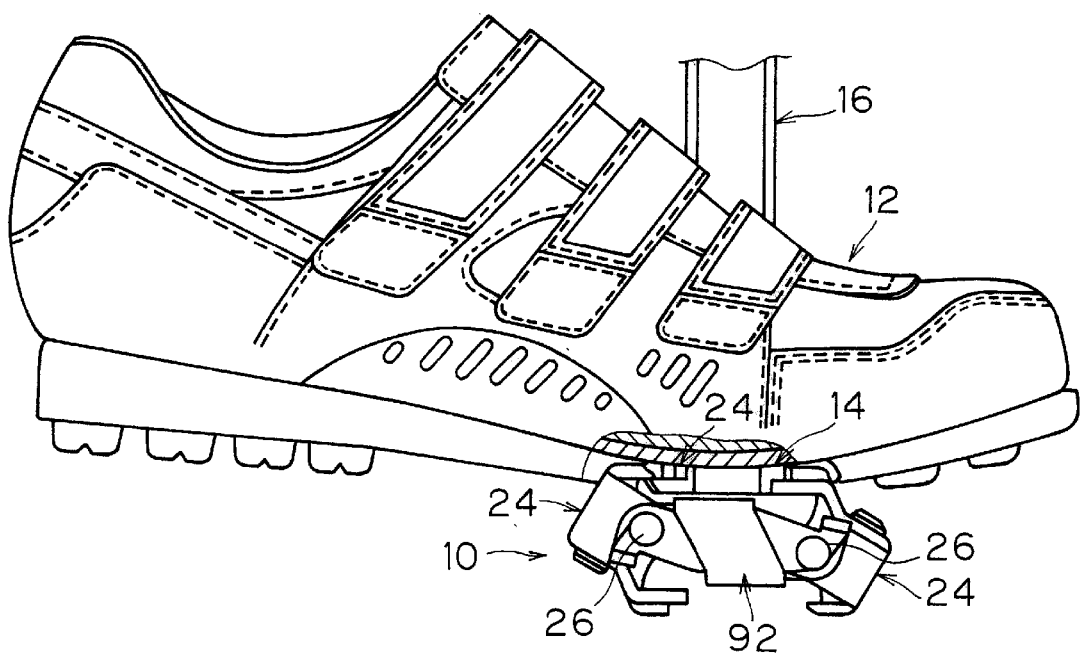
FIG. 1 is an outside elevational view of a bicycle shoe attached to a right bicycle clipless pedal coupled to a cleat of a bicycle shoe in accordance with a first embodiment of the present invention.

Referring initially to FIGS. 1 through 4, a bicycle pedal 10 is illustrated in accordance with the first embodiment of the present invention. Bicycle pedal 10 is a clipless or step-in pedal that can be used with a bicycle shoe 12 with a cleat 14 coupled thereto. Bicycle pedal 10 is especially designed for use with off-road bicycles as opposed to use with a road bicycle. Of course, bicycle pedal 10 can be used on a road bicycle or any type of bicycle if needed and/or desired. As seen in FIG. 1, bicycle pedal 10 is fixedly coupled to bicycle crank arm 16 of a bicycle for rotation therewith, while cleat 14 is fixedly coupled to the bottom of sole 18 of a shoe 12.

Figure 2:
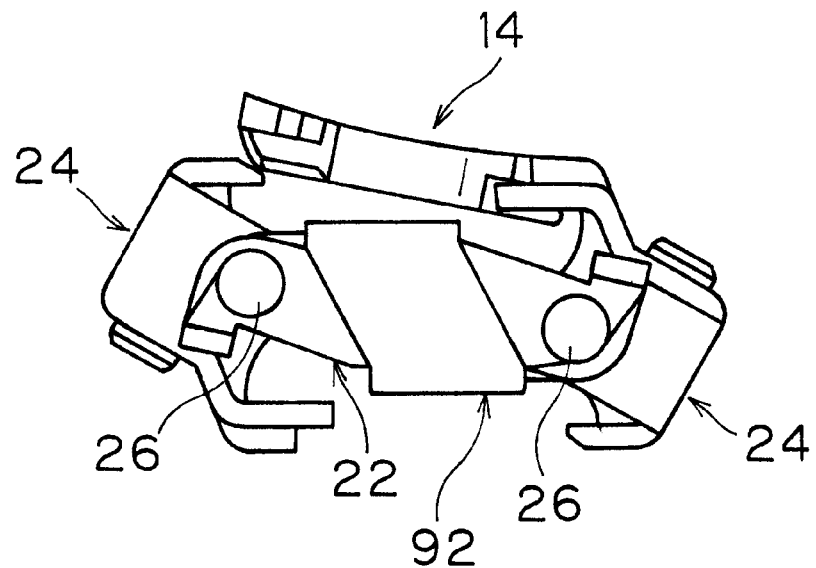
FIG. 2 is an outside elevational view of the right bicycle pedal illustrated in FIG. 1 in accordance with a first embodiment of the present invention with a cleat partially coupled thereto.
Figure 3:
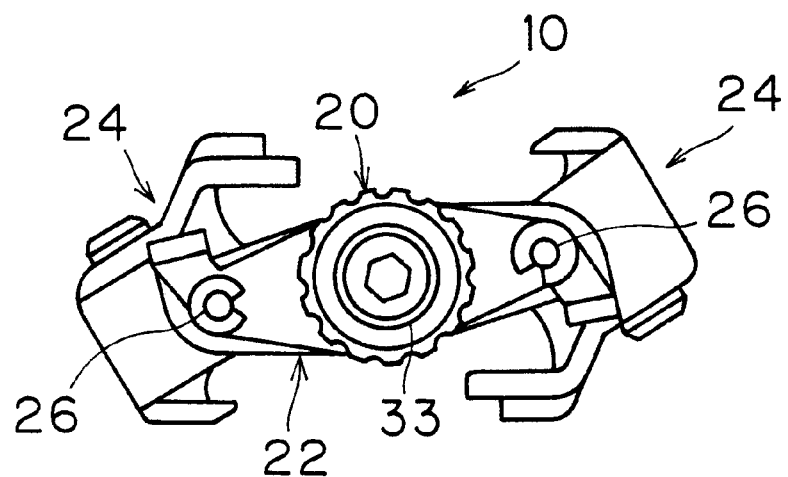
FIG. 3 is an inside elevational view of the right bicycle pedal illustrated in FIGS. 1 and 2 in accordance with a first embodiment of the present invention.
Figure 4:
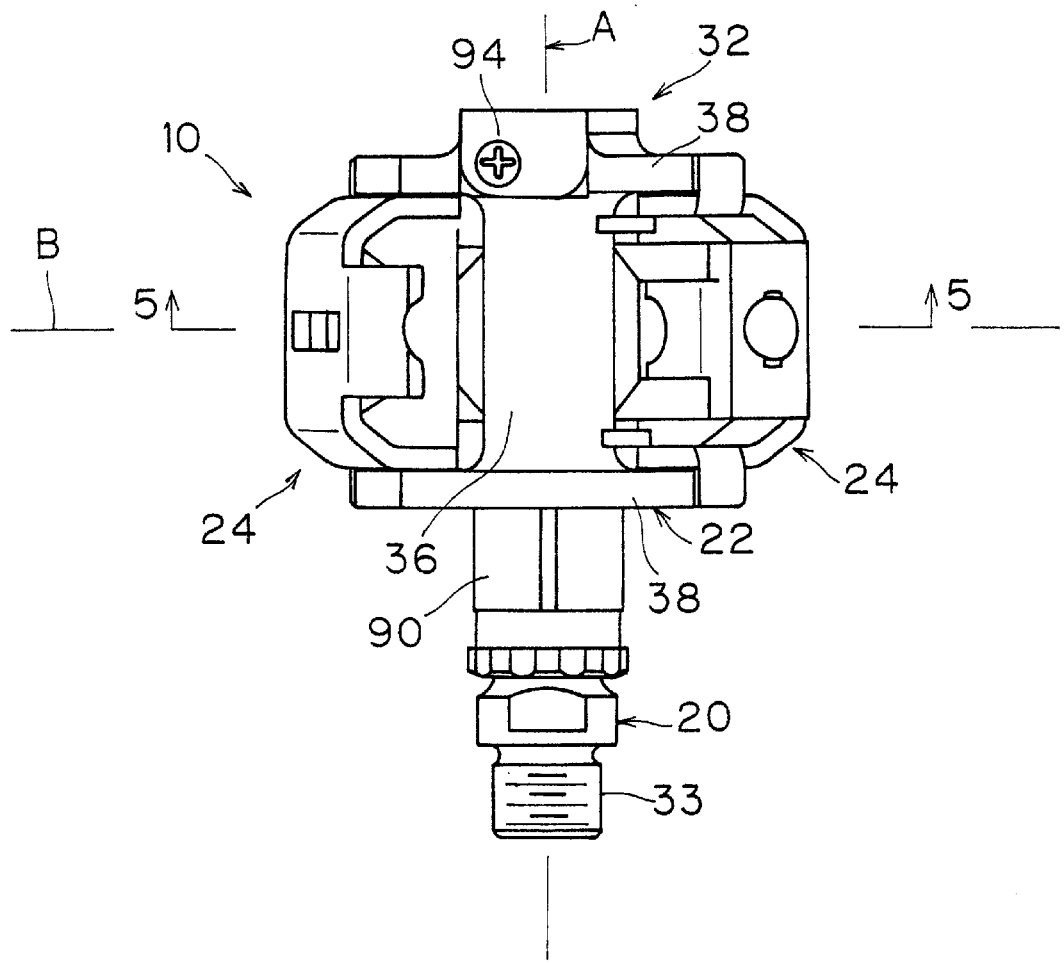
FIG. 4 is a top plan view of a left bicycle pedal similar to the right bicycle pedal illustrated in FIG. 1 in accordance with a first embodiment of the present invention.
Figure 5:
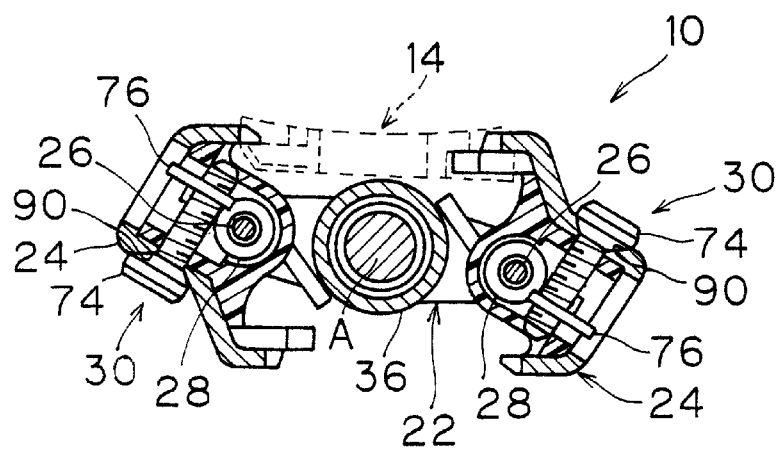
FIG. 5 is a longitudinal cross-sectional view of the left bicycle pedal illustrated in FIG. 4 as seen along section line 5—5 of FIG. 4, with a cleat shown in broken lines coupled thereto.
Figure 6:
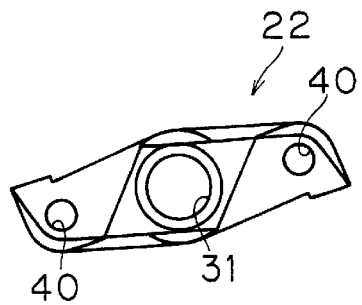
FIG. 6 is an outside elevational view of the pedal body for the bicycle pedal illustrated in FIGS. 4 and 5.
Figure 7:
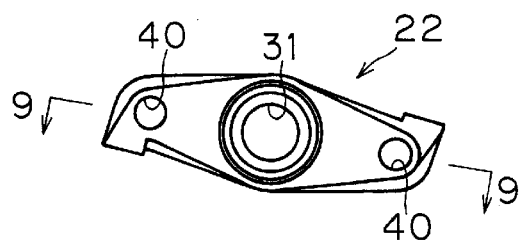
FIG. 7 is an inside elevational view of the pedal body illustrated in FIGS. 4–6 for bicycle pedal illustrated in FIG. 4.
Figure 8:
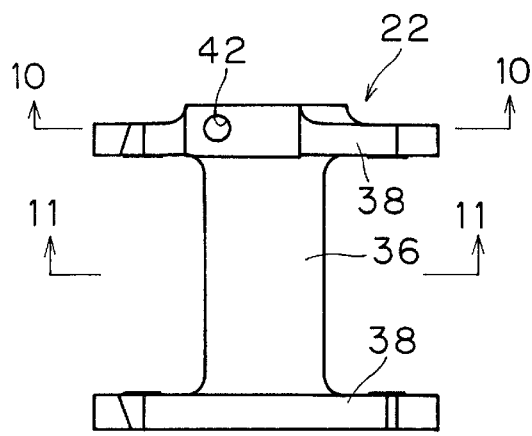
FIG. 8 is a top plan view of the pedal body in FIGS. 4–7 for the bicycle pedal illustrated in FIG. 4.

Bicycle pedal 10 illustrated in FIGS. 1 through 3 is a right side pedal, while bicycle pedal 10 illustrated in FIGS. 4 and 5 is a left side pedal. Of course, the same pedals are provided on the right and left sides of the bicycle, except that the left side pedal 10 being the mirror image of the right side pedal 10. Thus, the same reference numerals will be used to describe both the right and left pedals 10.

As seen in FIGS. 2 through 4, bicycle pedal 10 basically includes a pedal shaft or spindle 20 adapted to be coupled to crank arm 16 and a pedal body 22 rotatably coupled to spindle 20 for supporting a cyclist's foot. Pedal body 22 basically includes first and second clamping members 24, with each of the clamping members 24 being pivotally coupled to pedal body 22 by pivot pins 26, a pair of biasing members 28 and a pair of tension adjusting mechanisms 30. Each clamping member 24 together with its respective pivot pin 26, biasing member 28 and tension adjusting mechanism 30 form a front cleat engagement mechanism on one side of pedal body 22 and a rear cleat engagement mechanism on the opposite side of pedal body 22.

As seen in FIGS. 2 and 4, a gap adjusting mechanism 32 is coupled to pedal body 22 for controlling or limiting the amount of play or wobbling of the shoe 12 relative to bicycle pedal 10. In other words, gap adjusting mechanism 32 is designed to change the gap or space between the sole 18 of shoe 12 and bicycle pedal 10. Gap adjusting mechanism 32 will be discussed in more detail below.

Cleat 14 is designed to releasably couple sole 18 of shoe 12 to bicycle pedal 10 by first and second clamping members 24. This type of pedal is often called a step-in or clipless pedal. Specifically, cleat 16 is engaged with pedal 10 by pressing cleat 14 into pedal 10 with a forward and downward motion. This releasably locks cleat 14 to pedal 10. Cleat 14 can be released from pedal 10 by twisting the heel of the shoe to the outside of pedal 10 as discussed below in more detail.

As shown in FIG. 1, pedal spindle 20 is fastened to crank 16 of a bicycle, with pedal body 22 being rotatably coupled to pedal spindle 20 for supporting a rider's foot. Specifically, cleat 14 is fixedly attached to bicycle shoe 12, which in turn is releasably attached to pedal body 22 via one of the clamping members 24.

Figure 9:
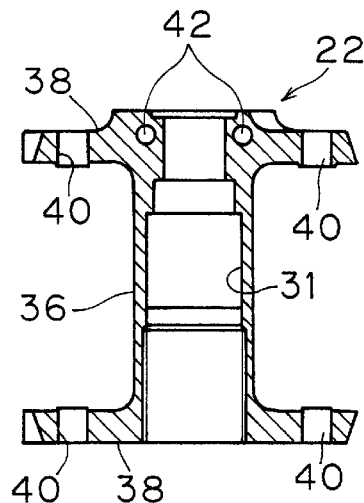
FIG. 9 is a transverse cross-sectional view of the bicycle pedal body illustrated in FIGS. 4–7 for the bicycle pedal illustrated in FIG. 4 as seen along section line 9—9 of FIG. 7.
Figure 10:
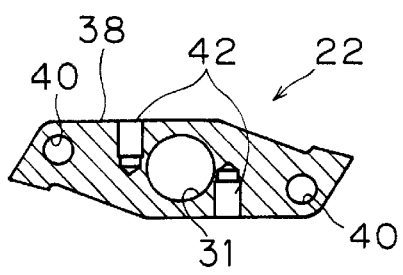
FIG. 10 is a longitudinal cross-sectional view of the pedal body illustrated in FIGS. 4–7 for the bicycle pedal illustrated in FIG. 4 as seen along section line 10—10 of FIG. 8.
Figure 11:
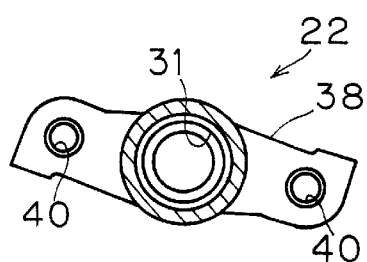
FIG. 11 is a longitudinal cross-sectional view of the bicycle pedal body illustrated in FIGS. 4–7 for the bicycle pedal illustrated in FIG. 4 as seen along section line 11—11 of FIG. 8.

Pedal spindle 20 is a multi-step spindle having numerous stepped portions which is received in a stepped bore 31 (see FIG. 9) formed in pedal body 22. Pedal spindle 20 has a first end 33 with threads formed thereon for threadedly coupling pedal 10 to crank 16 in a conventional manner. The other end of pedal spindle 20 rotatably supports pedal body 22 in a conventional manner. Pedal body 22 can freely rotate about the center longitudinal axis A of pedal spindle 20. Since pedal spindle 20 is relatively conventional and its specific construction is not critical to the present invention, the construction of pedal spindle 20 will not be discussed in detail herein.

As shown in FIGS. 4 through 11, pedal body 22 has a center tubular portion 36 for receiving pedal spindle 20 for rotation about center longitudinal axis A and a pair of side portions 38 for supporting clamping members 24. Pedal body 22 is preferably made of a lightweight material such as an aluminum alloy. One of the clamping members 24 is located at each end of pedal body 22. In particular, pedal body 22 is an H-shaped member (see FIGS. 8 and 9). Pedal body 22 has a front or first end with one of the clamping member 24 pivotally coupled thereto via one of the pivot pins 26, and a rear or second end with rear clamping member 24 pivotally coupled thereto via the other pivot pin 26.

Side portions 38 extend forward and backward from center tubular portion 36, and are located on opposite sides of clamping members 24. Pivot holes 40 are formed at each end of side portions 38 for fixedly receiving pivot pins 26 to pivotally couple clamping members 24 thereto. The side portion 38 that is located on the outside of pedal body 22 has a threaded attachment hole 42 formed on each of its upper and lower surfaces (see FIGS. 8 and 9). Attachment holes 42 are designed to attach a part of gap adjusting mechanism 32 thereto as discussed below. The side portion 38 that is located on the inside of pedal body 22 has a part of tubular portion 36 extending outwardly therefrom.

As best seen in FIGS. 3 and 4, pedal body 22 is rotatably coupled to pedal shaft 20 for rotation about a center longitudinal axis A of pedal shaft 20. Pedal body 22 has a center longitudinal axis B extending between the front and the rear ends as seen in FIGS. 2–4. Center longitudinal axis B of pedal body 22 extends substantially perpendicular to center longitudinal axis A of pedal shaft 20. A cleat receiving area is formed on each side of pedal body 22 for receiving and supporting cleat 14 thereon. More specifically, cleat receiving area is defined between clamping members 24.

Clamping members 24 selectively engage cleat 14 of bicycle shoe 12 to attach the sole of a bicycle shoe 12 to pedal 10. Clamping members 24 are pivotally coupled to the ends of the pedal body 22 by pivot pins 26. Clamping members 24 are curved in a roughly U-shaped configuration, with its two ends being swingably supported by pivot pins 26 (see FIGS. 7 and 8) that passes between side portions 38 of pedal body 22.

Each biasing member 28 is preferably formed by a pair of torsion springs. The torsion springs of biasing members 28 have their coiled portions mounted on pivot pins 26, with one end of each spring engaging a part of pedal body 22 and the other end of each spring engaging a part of tension adjusting mechanism 30 as mentioned below. Biasing members 28 normally urge clamping members 24 to rotate about their respective pivot pins 26 from their cleat releasing positions to their cleat engaging or clamping positions. In other words, biasing members 28 normally maintain clamping members 24 in cleat engaging positions. The retaining forces of biasing members 28 on clamping members 24 are controlled by tension adjusting mechanisms 30.

Referring now to FIGS. 12–17, each of the clamping members 24 includes a connecting portion 50 with a pair of legs 52 extending downwardly from connecting portion 50 for coupling clamping member 24 to pedal body 22 via pivot pins 26. More specifically, each of the legs 52 of rear clamping members 24 has a mounting hole 54 formed therein for receiving a bushing (not shown) which in turn rotatably receives pivot pin 26. Accordingly, each clamping member 24 is pivotally mounted about its respective pivot pin 26 for movement between a cleat clamping position and a cleat releasing position. Each of the legs 52 also has a stop portion or flange 58 which engages pedal body 22 to limit rotational movement of clamping member 24 via biasing member 28.

Each of the clamping members 24 has a front cleat engagement portion 60 and a rear cleat engagement portion 62. Front cleat engagement portion 60 extends from one side of connecting portion 50, while rear cleat engagement portion 62 extends from the other side of connecting portion 50. Front cleat engagement portion 60 engages the front portion of cleat 14, while a rear cleat engagement portion 62 engages the rear portion of cleat 14. Front cleat engagement portions 60 of each of clamping members 24 has a first cleat engagement surface 64 facing in a first direction and a second cleat engagement surface 66 facing in a second direction which is substantially opposite to the first direction.

First cleat engagement surface 64 is formed by a raised center flange 67 having a curved stop surface 68 for engaging cleat 14 to limit longitudinal movement of cleat 14 relative to pedal body 22. Curved stop surface 68 extends substantially perpendicular to first cleat engagement surface 64. Second cleat engagement surface 66 is formed by a pair of side flanges or sections 69, which are located on opposite sides of the raised center flange 67. In other words, second cleat engagement surface 66 has two spaced apart sections with first cleat engagement surface 64 located between spaced apart sections formed by side flanges or sections 69 of second cleat engagement surface 66. Side flanges or sections 69 of second cleat engagement surface 66 are located closer to tubular portion 36 of pedal body 22 than first cleat engagement surface 64. Accordingly, a gap is formed between tubular portion 36 of pedal body 22 and first cleat engagement surface 64. In other word, side flanges or sections 69 of second cleat engagement surface 66 are located closer to tubular portion 36 of pedal body 22 than first cleat engagement surface 64.

First and second cleat engagement surfaces 64 and 66 preferably lie in substantially the same plane, but face in opposite directions. More specifically, first cleat engagement surface 64 faces downwardly away from sole 18 of shoe 12, while second cleat engagement surface 66 faces upwardly toward sole 18 of shoe 12. Thus, first and second cleat engagement surfaces 64 and 66 hold cleat 14 about tubular portion 36 of pedal body 22.

Figure 12:
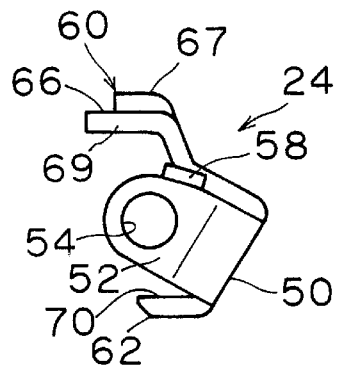
FIG. 12 is a side elevational view of one of the clamping members for the bicycle pedal illustrated in FIGS. 1–5.
Figure 13:
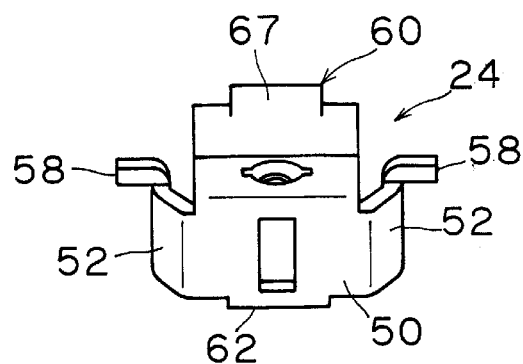
FIG. 13 is a right side elevational view of the clamping member illustrated in FIG. 12 for the bicycle pedal illustrated in FIGS. 1–5.
Figure 14:
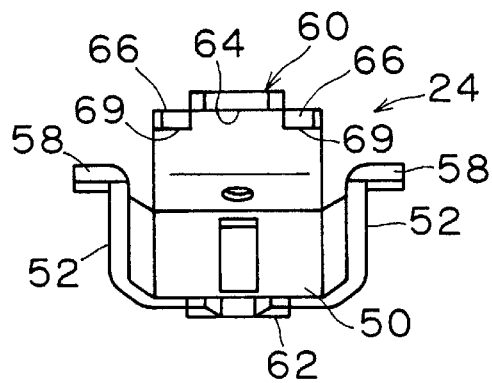
FIG. 14 is a left side elevational view of the clamping member illustrated in FIGS. 12 and 13 for the bicycle pedal illustrated in FIGS. 1–5.
Figure 15:
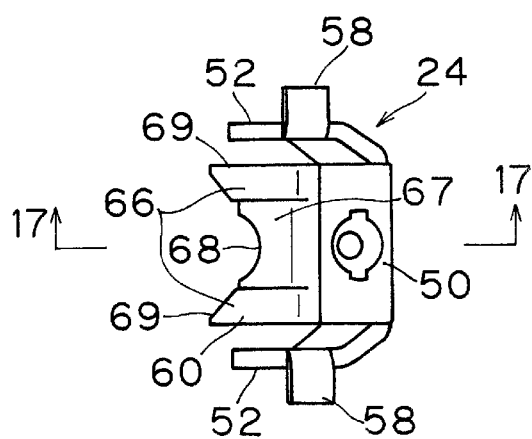
FIG. 15 is a top plan view of the clamping member illustrated in FIGS. 12–14 for the bicycle pedal illustrated in FIGS. 1–5.
Figure 16:
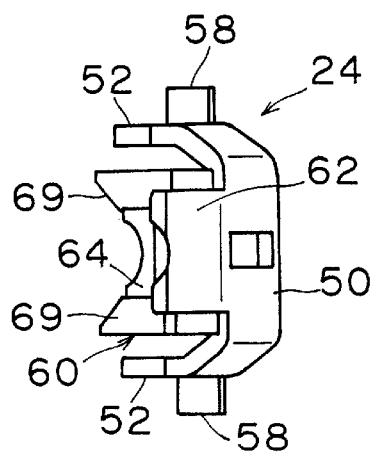
FIG. 16 is a bottom plan view of the clamping member illustrated in FIGS. 12–15 for the bicycle pedal illustrated in FIGS. 1–5.
Figure 17:
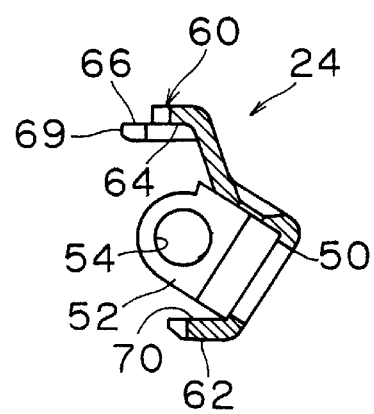
FIG. 17 is a cross-sectional view of the clamping member illustrated in FIGS. 12–16 for the bicycle pedal illustrated in FIGS. 1–5 as seen along section line 17—17 of FIG. 15.
Figure 18:
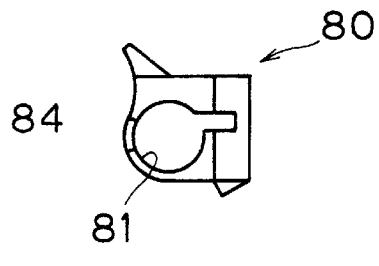
FIG. 18 is a side elevational view of one of the cover members for the tension adjustment mechanism of the bicycle pedal illustrated in FIGS. 1–5.
Figure 19:
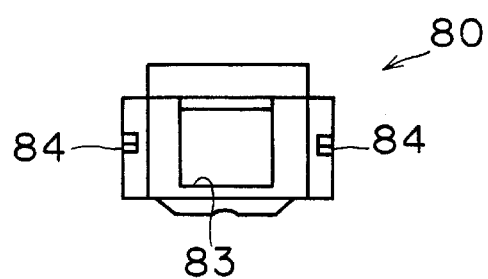
FIG. 19 is a right side elevational view of the cover member illustrated in FIG. 18 for the bicycle pedal illustrated in FIGS. 1–5.
Figure 20:
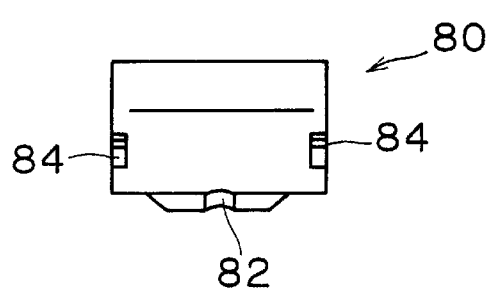
FIG. 20 is a left side elevational view of the cover member illustrated in FIGS. 18 and 19 for the bicycle pedal illustrated in FIGS. 1–5.
Figure 21:
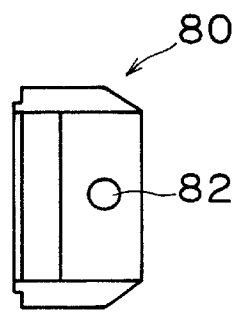
FIG. 21 is a top plan view of the cover member illustrated in FIGS. 18–20 for the bicycle pedal illustrated in FIGS. 1–5.
Figure 22:
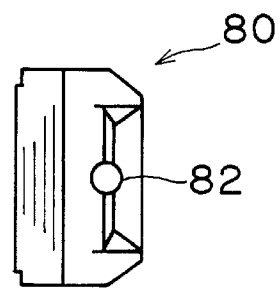
FIG. 22 is a bottom plan view of the cover member illustrated in FIGS. 18–21 for the bicycle pedal illustrated in FIGS. 1–5.

As best seen in FIGS. 12 and 17, rear cleat engagement portion 62 has a downwardly facing cleat engagement surface 70, which faces in substantially the same direction as first cleat engagement surface 64 of the front cleat engagement portion 60 of the other clamping member 24. A curved stop surface 72 is also formed on rear cleat engagement portion 62 for engaging cleat 14 to limit its longitudinal movement relative to pedal body 22, as explained below. Curved stop surface 72 extends substantially perpendicular to cleat engagement surface 70.

Operation of the pedal 10 will now be briefly described with reference to FIGS. 1, 2, and 5. When bicycle shoe 12 is to be attached to the pedal 10, the tip of the shoe is moved forward towards one of the front cleat engagement portions 60 so that the tip of cleat 14 is inserted into one of the cleat clamping members 24 (see FIG. 2).

Once the tip of the cleat 14 has been inserted into one of the cleat clamping members 24 of the front cleat engagement portion 60, force is applied to the heel side of the shoe 12, such that the shoe 12 is pushed down toward the pedal 10. When the heel is pressed down further from this state, the rear end of the cleat 14 rotates the rear cleat engagement portion 62 backward against the biasing force of the springs 28. Cleat 14 then slides between the two cleat engagement portions 60 and 62. Once the cleat 14 has slid between the two cleat engagement portions 60 and 62, the rear cleat engagement portion 62 is biased by the springs 28 back to its original position. Rotation of the rear cleat engagement portions 62 is stopped by flanges 58 engaging side portions 38 of pedal body 22. As a result, cleat 14 is engaged between the two cleat engagement portions 60 and 62 of clamping members 24 (see FIGS. 1 and 5).

When the shoe 12 is to be removed from the pedal 10, the heel portion of the shoe 12 is lightly twisted to the outside. This twisting motion will cause the rear cleat engagement portion 62 to rotate against the energizing force of the springs 28, and the engagement of the rear end of the cleat 14 will be released instantly.

Referring to FIG. 5, each of the tension adjustment mechanisms 30 preferably includes an adjustment bolt 74 and an adjusting nut 76. Adjustment bolt 74 is rotatably received in hole 90 of clamping member 24. Moreover, adjusting nut 76 is threaded onto adjustment bolt 74, and has a pair of flanges for engaging one of the ends of springs of biasing member 28. Accordingly, rotation of adjustment bolt 74 causes adjusting nut 76 to move axially along the shaft of adjustment bolt 74. Preferably, clockwise rotation of adjustment bolt 74 causes the spring tension of biasing member or springs 28 on clamping member 24 to increase, while counterclockwise rotation of adjustment bolt 74 causes a decrease in the spring tension of biasing member or springs 28 on clamping member 24. A tab of adjusting nut 76 is located within a slot of clamping member 24. Preferably, adjusting nut 76 is visible through the slot in clamping member 24 such that it acts as a tension indicator for the user to determine the amount of tension being applied by biasing member 28 on clamping member 24. This allows the user to easily adjust a pair of bicycle pedals 10 such that they each have equal spring tension.

Now referring to FIGS. 5 and 18–22, cover members 80 are designed to protect biasing members 28 and tension adjustment mechanisms 30 from mud and/or other contaminants to prevent clogging of the operation of tension adjustment mechanisms 30 and/or biasing members 28. Preferably, each cover member 80 is constructed of a lightweight material such as plastic. Cover members 80 are formed to fit snugly within clamping members 24 and overlie pivot pins 26 and biasing members 28. Specifically, the ends of each cover member 80 contacts legs 52 of its associated clamping member 24 and its sides contact the associated front and rear cleat engagement portions 60 and 62. Thus, biasing members 28 and tension adjustment mechanisms 30 are enclosed between cover members 80 and clamping members 24. Preferably, each cover member 80 is spaced from tubular portion 36 of pedal body 22 so that mud and/or other contaminants can pass therebetween.

Each cover member 80 has a through bore 81 for receiving one of the pivot pins 26 and one of the biasing members 28 therethrough. Each cover member 80 also has a second transverse hole 82 for receiving adjustment bolt 74 therethrough. Thus, cover members 80 are secured to clamping members 24 by pivot pins 26 and adjustment bolts 74. Cover members 80 are designed to move with the respective clamping members 24.

The rear face of each cover member 80 has a rectangular opening 83 that receives adjusting nut 76. Thus, adjusting nut 76 is supported on adjustment bolt 74 within cover member 80. The front face of each cover member 80 has a pair of notches 84 such that one end of the springs 28 can extend out from cover member 80 and engage tubular portion 36 of pedal body 22. The other ends of springs 28 are contained within cover member 80 and engage adjusting nut 76.

Preferably, gap adjusting mechanism 32 is located along longitudinal axis A of pedal shaft 20 such that gap adjusting mechanism 32 at least partially intersects with the center longitudinal axis A of pedal shaft 20 to support sole 18 of shoe 12. Gap adjusting mechanism 32 is located outside of the cleat receiving area such that cleat 14 does not contact gap adjusting mechanism 32. Rather, gap adjusting mechanism 32 contacts sole 18 of shoe 12 to prevent or limit relative movement between pedal body 22 and cleat 14.

Gap adjusting mechanism 32 preferably includes a first gap adjusting member 90 and a second gap adjusting member 92, which are interchangeable with different sized adjusting members to change the gap between the sole 18 and pedal body 22. In other words, the adjustment of the gap between cleat 14 and the cleat receiving area of pedal body 22 can be adjusted by interchanging different sizes of adjusting members 90 and/or 92. Moreover, even in the illustrated gap adjusting mechanism 32, it will be apparent to those skilled in the art once given this disclosure that adjusting members 90 and 92 can be replaced when worn out with new adjusting members or could be interchanged with different size or shape adjusting members as needed and/or desired.

Figure 23:
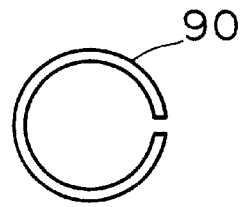
FIG. 23 is an end elevational view of the first gap adjustment member or sole contact member for the gap adjustment mechanism of the bicycle pedal body illustrated in FIGS. 1–5.
Figure 24:
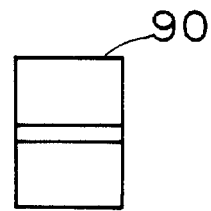
FIG. 24 is a side elevational view of the first gap adjustment member or sole contact member illustrated in FIG. 23 for the bicycle pedal illustrated in FIGS. 1–5.
Figure 25:
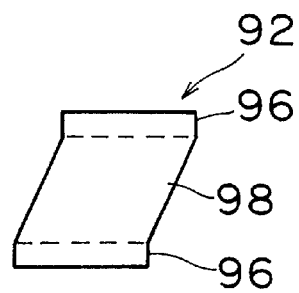
FIG. 25 is an end elevational view of the second gap adjustment member or sole contact member of for the gap adjustment mechanism of the bicycle pedal illustrated in FIGS. 1–5.
Figure 26:
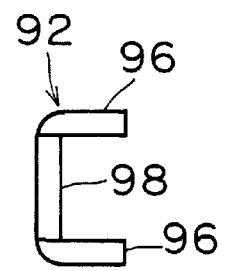
FIG. 26 is a side elevational view of the second gap adjustment member or sole contact member illustrated in FIG. 25 for the bicycle pedal illustrated in FIGS. 1–5.
Figure 27:
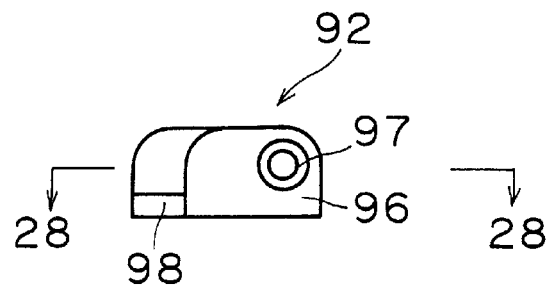
FIG. 27 is a top plan view of the second gap adjustment member or sole contact member illustrated in FIGS. 25 and 26 for the bicycle pedal illustrated in FIGS. 1–5.
Figure 28:
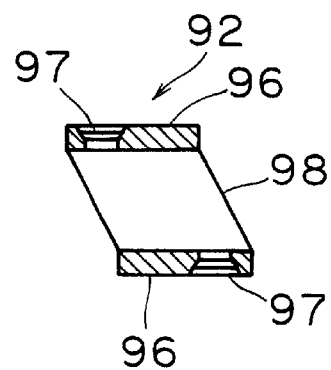
FIG. 28 is a cross-sectional view of the second clamping member or sole contact member illustrated in FIGS. 25–27 as seen along section line 28—28 of FIG. 27.
Figure 29:
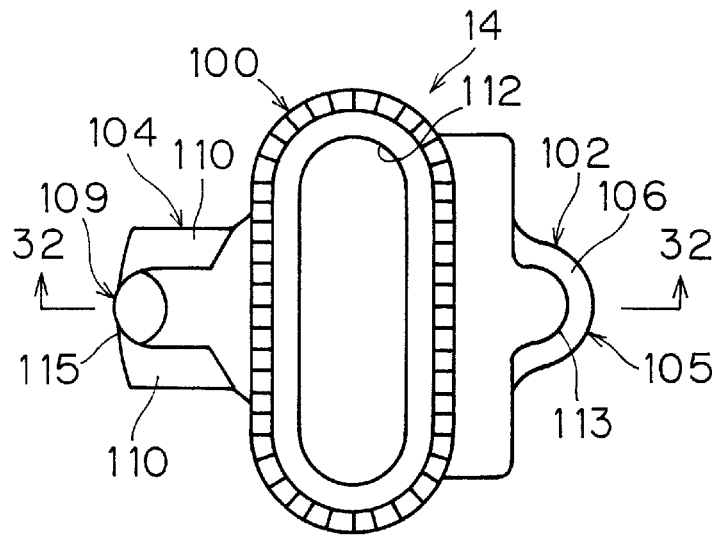
FIG. 29 is a top plan view of the cleat, which cooperates with the bicycle pedal illustrated in FIGS. 1–5 and FIGS. 35–40.
Figure 30:
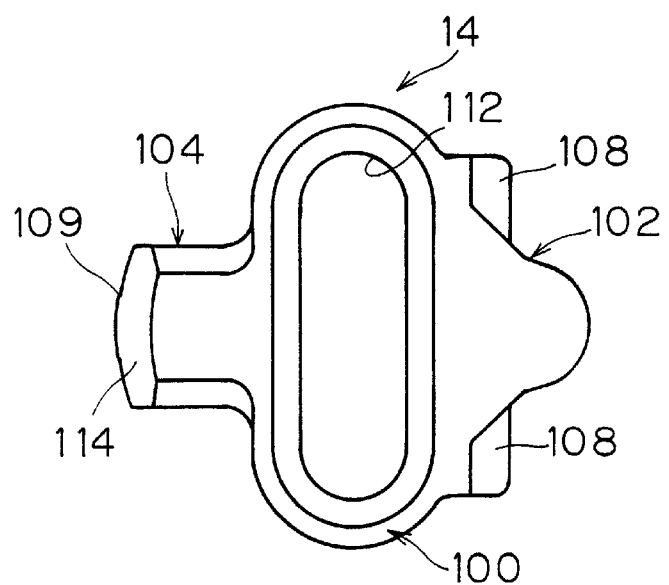
FIG. 30 is a bottom plan view of the cleat illustrated in FIG. 29 for use with the bicycle pedal illustrated in FIGS. 1–5 and FIGS. 35–40.
Figure 31:
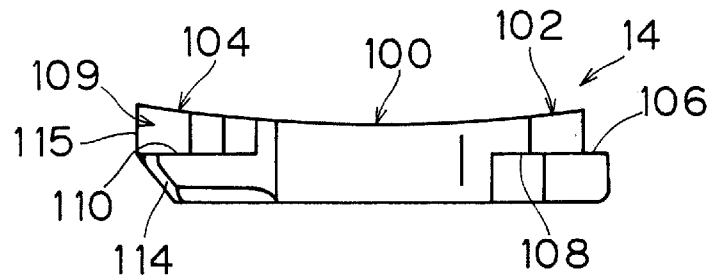
FIG. 31 is a side elevational view of the cleat illustrated in FIGS. 29 and 30 for use with the bicycle pedal illustrated in FIGS. 1–5 and FIGS. 35–40.
Figure 32:
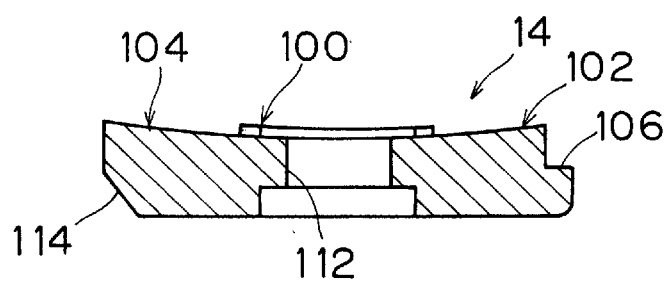
FIG. 32 is a cross-sectional view of the cleat illustrated in FIGS. 29–31 for use with the bicycle pedal illustrated in FIGS. 1–5 and FIGS. 35–40 as seen along section line 32—32 of FIG. 29.
Figure 33:
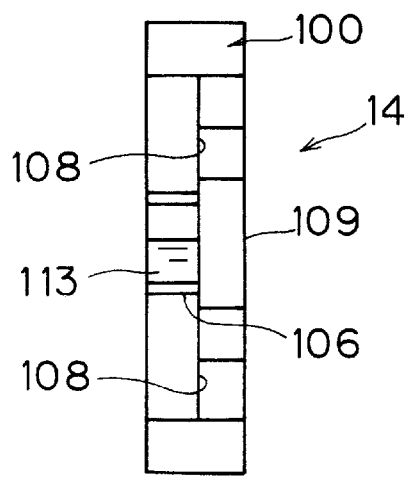
FIG. 33 is a right end elevational view of the cleat illustrated in FIGS. 29–32 for use with the bicycle pedal illustrated in FIGS. 1–5 and FIGS. 35–40.
Figure 34:
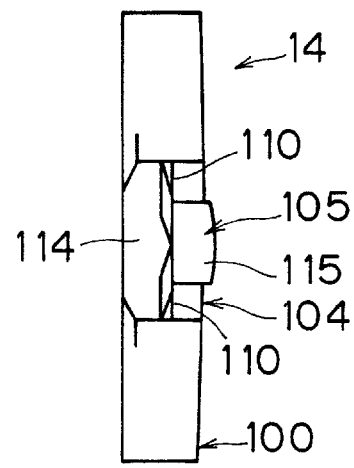
FIG. 34 is a left end elevational view of the cleat illustrated in FIGS. 29–33 for use with the bicycle pedal illustrated in FIGS. 1–5 and FIGS. 35–40.

As seen in FIGS. 4, 23 and 24, first adjustment member 90 is preferably a split tubular member constructed of a resilient lightweight material such as plastic. The longitudinal split of first adjustment member 90 allows the first adjustment member 90 to be elastically deformed such that different size adjustment members can be placed on tubular portion 36 which encircles pedal shaft 20. In other words, tubular adjustment member 90 is formed of a rigid material with sufficient resiliency such that adjustment member 90 can be partially unrolled to be replaceably coupled about pedal shaft 20. In particular, the various sizes of adjustment members 90 would have the same inner diameter, but different outer diameters such that the thickness of the tubular wall changes. By changing the outer diameter of the first adjustment member 90, the gap between the inner portion of sole 18 of shoe 12 and the upper surface of the pedal body 22 is changed. Accordingly, if the rider desires less wobbling of the shoe 12 relative to the pedal body 22, a larger diameter adjustment member 90 is selected.

The outer surface of adjustment member 90 forms a sole contact surface for engaging sole 18 of shoe 12. Thus, the first sole contact surface of first gap adjustment member 90 is removably coupled adjacent to the inner side portion of pedal body 22 and positioned along the longitudinal axis of rotation A for supporting sole 18 above tubular portion 36.

As seen in FIGS. 2, 4 and 25–28, second adjustment member 92 is preferably a U-shaped member constructed of a rigid material such as steel. Second adjustment member 92 is attached to the pedal body 22 by a pair of fasteners or screws 94, which are threaded into holes 42 in the pedal body 22. Adjustment member 92 is non-movably coupled relative to pedal body 22 when coupled to pedal body 22 by fasteners or screws 94. The shafts of screws 94 have their longitudinal axes extending substantially perpendicular to the longitudinal axis A of pedal shaft 20. Accordingly, adjustment member 92 can be easily replaced with a different size adjustment member 92 as needed and/or desired.

Adjustment member 92 has a pair of parallel sole contact members or pads 96 with holes 97 and an intermediate member 98 interconnecting sole contact pads 96 together. By changing the thickness of the pads, the rider can adjust the gap between the pedal body 22 and the sole 18 of shoe 12. In particular, the various adjustment members 92 would all be identical except that the thickness of the pads 96 would change. Sole contact pads 96 of adjustment member 92 forms a pair of oppositely facing sole contact surfaces that are removably coupled adjacent to the outer side portion of pedal body 22. The sole contact surfaces are preferably substantially planar surfaces that are at least partially positioned along said longitudinal axis of rotation A for supporting sole 18 above tubular portion 36.

Referring now to FIGS. 29 through 34, bicycle shoe cleat 14 basically includes an attachment portion 100, a first coupling portion or member 102 extending from one end of attachment portion 100 and a second coupling portion or member 104 extending from the other end of attachment portion 100. Attachment portion 100 has an upper sole side facing in a first direction for engaging sole 18 of shoe 12 and a lower pedal side facing in a second direction which is substantially opposite to said first direction. Preferably attachment portion 100 and coupling portions 102 and 104 are integrally formed together as a one-piece, unitary member, which is constructed from a suitable rigid material.

Attachment portion 100 has a hole or slot 112 for receiving one or more fasteners for fixedly coupling cleat 14 to sole 18 of the cyclist's shoe 12 in a relatively conventional manner. The interconnection of cleat 14 to sole 18 is relatively well known in the art, and thus, this interconnection will not be discussed or illustrated in detail herein.

First or front coupling portion 102 has a nose portion 105 with a first coupling surface 106 and side portions with second coupling surfaces 108. First coupling surface 106 faces towards sole 18 of shoe 12, while second coupling surfaces 108 face in substantially the opposite direction towards pedal body 22. First coupling surface 106 is located between the upper and lower pedal sides of attachment portion 100. Preferably, coupling surfaces 106 and 108 are formed so as to lie in substantially the same plane.

Front coupling portion 102 forms a first coupling member that extending from the front end of attachment portion 100. Front coupling portion 102 has its nose portion 105 designed to engage front cleat engagement portion 60 of clamping member 24. Nose portion 105 also has a curved stop surface 113 formed thereon, which extends substantially perpendicular to the coupling surfaces 106 and 108. Front coupling surfaces 106 and 108 are preferably a substantially flat planar surface which is designed to engage front cleat engaging surfaces 64 and 66 of front cleat engagement portion 60 of clamping member 24, discussed above. Front coupling surface 106 is substantially flat or planar surface that curves about curved stop surface 113. Front coupling surfaces 108 form a split-coupling surface with two sections. Front coupling surface 106 is located between front coupling surfaces 108. Front coupling surface 106 is located further from said attachment portion than front coupling surfaces 108.

Curved stop surface 113 is designed to engage curved stop surface 68 of front clamping member 24 to prevent forward movement of cleat 14 relative to pedal body 22. Curved stop surfaces 68 and 113 together act as a pivot point for releasing cleat 14 from pedal body 22.

Second or rear coupling portion 104 extends from the second end of attachment portion 100 and has a nose portion 109 with a pair of third coupling surfaces 110 facing in substantially the same direction as the first coupling surface 106 of first coupling portion 102.

Rear coupling surfaces 110 of rear coupling portion 104 engages rear cleat engaging surface 70 of rear cleat engagement portion 62 of clamping member 24 to secure cleat 14 to pedal body 20 via one of the clamping members 24. Rear coupling surfaces 110 are preferably substantially flat planar surfaces. Rear coupling portion 104 also has a curved or angled ramp surface 114, which is designed to engage rear cleat engagement portion 62 of clamping member 24 during coupling of cleat 14 to pedal body 22. In particular, ramp surface 114 is designed to rotate clamping member 26 rearwardly from its normal cleat engaging position to its cleat releasing position during the downward movement of cleat 14 relative to pedal body 22. Rear attachment portion also includes a curved stop surface 115 for engaging curved stop surface 72 to prevent rearward movement of cleat 14 relative to pedal body 22 when coupled thereto.

In coupling cleat 14 to bicycle pedal 10, the rider steps onto pedal body 22 which in turn causes clamping members 24 to automatically grip on to cleat 14 secured to the sole 18 of the cyclist's shoe 12. Tension adjusting mechanisms 30 can be adjusted to vary the force required for releasing the shoe cleat 14 from the step-in pedal 10.

More specifically, when attaching the cyclist's shoe to the step-in pedal 10 through cleat 14, the cyclist moves the shoe 12 obliquely downwardly and forwardly relative to pedal body 22 such that the front end or nose portion 105 of cleat 14 engages front cleat engagement portion 60 of one of clamping members 24 of pedal body 22. Once the front end of cleat 14 is engaged with front cleat engagement portion 60 of one of clamping members 24, the cyclist places the rear end of cleat 14 in contact with rear cleat engagement portion 62 of the other clamping member 24 of pedal body 22. This causes cam surface 114 to engage the angled surface of rear cleat engagement portion 62. In this position, the cyclist presses the shoe 12 downwardly against pedal 10 to cause the rear one of the clamping member 24 to initially pivot rearwardly against the force of biasing member 28 to a cleat releasing position. The rear end of cleat 14 then enters a position opposite a back face of the rear engagement portion 62 of clamping member 24. Then, rear clamping member 24 returns under the force of a biasing member 28 so that rear engagement portion 62 of clamping member 24 engages the rear end of cleat 14. This engagement fixes the cyclist's shoe to pedal 10 via cleat 14.

In the cleat engaged position, the front coupling portion 102 of cleat 14 prevents front vertical movement. Specifically, first cleat engagement surface 64 contacts first front coupling surface 106 and second cleat engagement surface 66 contacts second front coupling surface 108. Rear cleat engagement surface 70 of clamping member 24 contacts rear coupling surface 110 of cleat 14 to fixedly couple rear coupling portion 104 of cleat 14 to pedal body 22. Gap adjustment members 90 and 92 limit vertical movement of rear coupling portion 104 of cleat 14 relative to pedal body 22. Preferably, gap adjustment members 90 and 92 will maintain a space between the bottom surface of cleat 14 and pedal body 22.

When releasing the shoe 12 from pedal 10, the cyclist will typically turn the shoe 12 about an axis perpendicular or approximately perpendicular to axis B of pedal 10. As a result of this pivoting action, the rear one of clamping members 24 is pivoted against the force of the springs 28 to a cleat releasing position to release the shoe 12 from pedal 10.

Modified Embodiment

Referring now to FIGS. 35–40, a pedal 210 in accordance with another embodiment of the present invention is illustrated. This embodiment is similar to the pedal 10, discussed above, except that an additional tension adjustment mechanism has been provided for biasing members 228 as discussed below. In view of the similarities between this embodiment and the first embodiment, pedal 210 will not be discussed or illustrated in as much detail.

Pedal 210 is a clipless or step-in pedal that can be used with cleat 14, which is illustrated in FIGS. 29–34 in detail. Accordingly, cleat 14 is coupled to pedal 210 in substantially the same manner as pedal 10, discussed above. Thus, this aspect of pedal 210 will not be discussed in detail herein. Moreover, bicycle pedal 210 basically includes a pedal shaft or spindle 220 adapted to be coupled to the crank arm 16 (see FIG. 1), and a pedal body 222 rotatably coupled to pedal shaft 220 for supporting a cyclist's foot.

Pedal body 222 basically includes first and second clamping members 224, with each of the clamping members 224 being pivotally coupled to pedal body 222 by pivot pins 226, a pair of biasing members 228 and a pair of tension adjusting mechanisms 230.

One main difference between pedal 10 and pedal 210 is that pedal 210 is provided with an adjustment member or screw 231. This adjustment member or screw 231 initially places each of the biasing members 228 under tension.

Specifically, when clamping members 224, and biasing members 228 are coupled to pedal body 222 by pivot pins 226, biasing members 228 are normally not under tension. Adjustment member or screw 231 is threaded into a threaded hole 229 formed in the pedal body 222 such that the free end of the screw 231 contacts a portion of the associated clamping member 224 to rotate the clamping member 224. The associated biasing member 228 is now placed under tension. This arrangement allows for easy assembly of the bicycle pedal 210, since clamping members 224 and biasing members 228 can be coupled to pedal body 222 without placing biasing members 228 under tension. Also, this arrangement allows the initial tension to be regulated by utilizing thin washers between the head of the screws 231 and the pedal body 222.

A gap adjusting mechanism 232 is coupled to pedal body 222 for controlling or limiting the amount of play or wobbling of the shoe 12 relative to bicycle pedal 210. In other words, gap adjusting mechanism 232 is designed to change the gap or space between the sole 18 of shoe 12 and bicycle pedal 210. Gap adjusting mechanism 232 is similar to gap adjusting mechanism 32 of the first embodiment. Thus, gap adjusting mechanism 232 will not be discussed in more detail herein. While pedal 210 is illustrated with only the U-shaped adjustment member 292, it will be apparent to those skilled in the art that a tubular adjustment member with a longitudinal split can also be used in the same manner as tubular adjustment member 90 of the first embodiment. Thus, this aspect of pedal 210 will not be discussed in detail herein. The only significant difference between the U-shaped adjustment member 292 of this embodiment and the first embodiment is that a single screw 294 is used which extends through intermediate member 298. Preferably, the longitudinal axis of screw 294 is aligned with axis A of pedal shaft 220.

Pedal spindle 220 is a multi-step spindle having numerous stepped portions which is received in a stepped bore 231 (see FIG. 40) formed in pedal body 222. Pedal spindle 220 has a first end 233 with threads formed thereon for threadedly coupling pedal 210 to crank 16 in a conventional manner. The other end of pedal spindle 220 rotatably supports pedal body 222 in a conventional manner. Pedal body 222 can freely rotate about the center longitudinal axis A of pedal spindle 220. Since pedal spindle 220 is relatively conventional and its specific construction is not critical to the present invention, the construction of pedal spindle 220 will not be discussed in detail herein.

Figure 35:
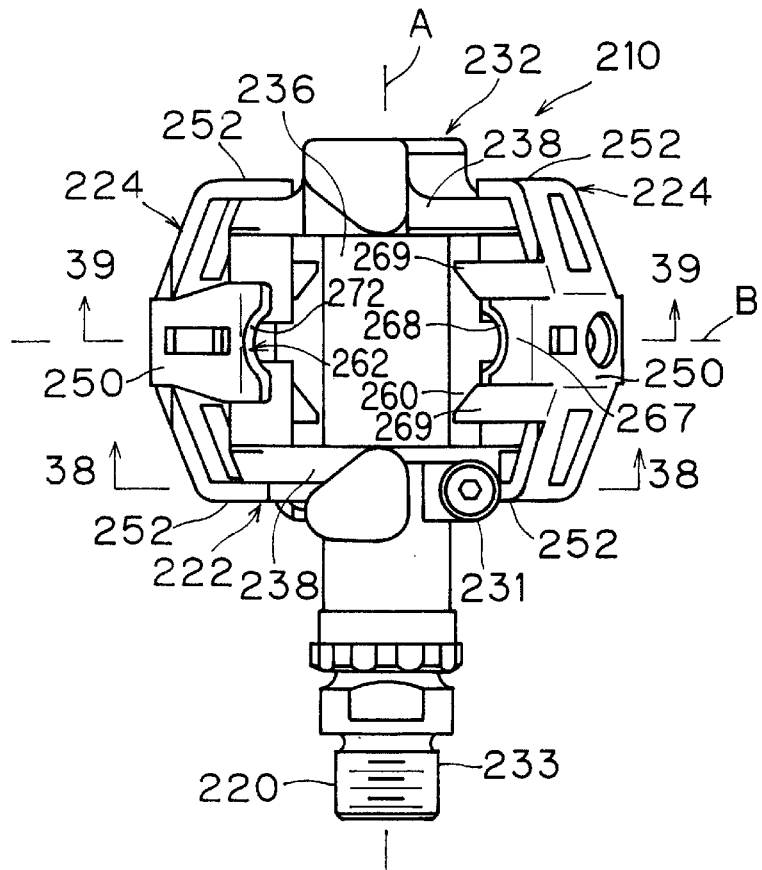
FIG. 35 is a top plan view of a left bicycle pedal illustrated in accordance with a modified embodiment of the present invention.
Figure 36:
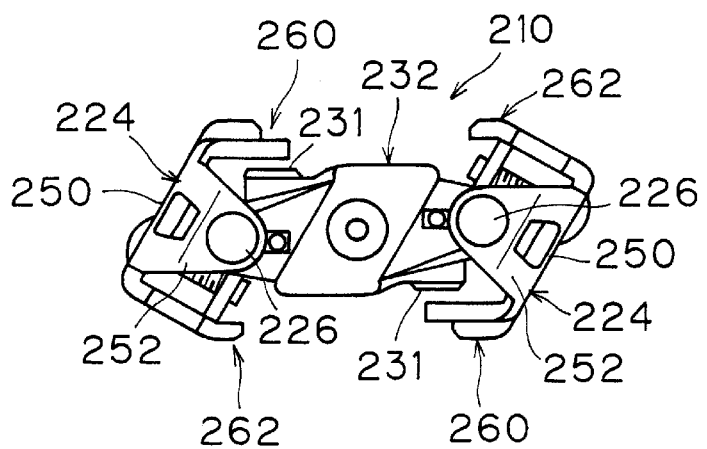
FIG. 36 is an outside elevational view of the left bicycle pedal illustrated in FIG. 35 in accordance with the modified embodiment of the present invention.
Figure 40:
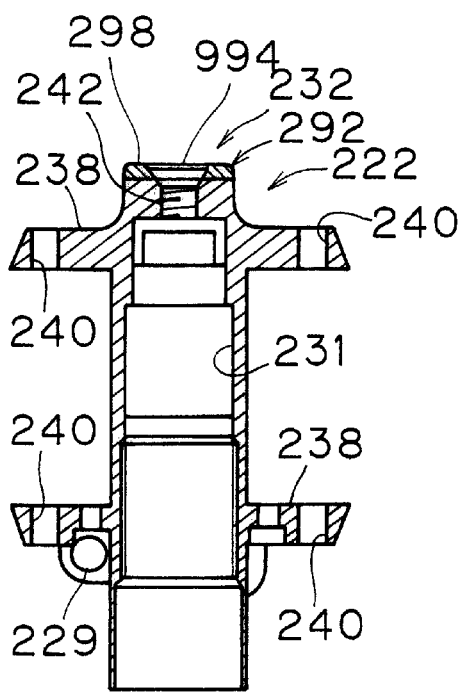
FIG. 40 is a transverse cross-sectional view of the left bicycle pedal body illustrated in FIG. 35–39 as seen along section line 40—40 of FIG. 37 with the various parts removed to illustrate the pedal body.

As shown in FIGS. 35 and 40, pedal body 222 has a center tubular portion 236 for receiving pedal spindle 220 for rotation about center longitudinal axis A and a pair of side portions 238 for supporting clamping members 224. Pedal body 222 is preferably made of a lightweight material such as an aluminum alloy. One of the clamping members 224 is located at each end of pedal body 222. In particular, pedal body 222 is an H-shaped member (see FIGS. 35 and 40), which has a front or first end with one of the clamping member 224 fixedly coupled thereto, and a rear or second end with rear clamping member 224 pivotally coupled thereto. Side portions 238 extend forward and backward from center tubular portion 236, and are located on opposite sides of clamping members 224. Pivot holes 240 are formed at each end of side portions 238 for fixedly receiving pivot pin 226 to pivotally couple clamping members 224 thereto. The side portion 238 that is located on the outside of pedal body 222 has a threaded attachment hole 242 formed on its outer surfaces with hole 242 having its center located on longitudinal axis A. Attachment hole 242 is designed receive screw 294 therein to attach the U-shaped adjustment member 292 of gap adjusting mechanism 232 thereto as mentioned above.

Figure 37:
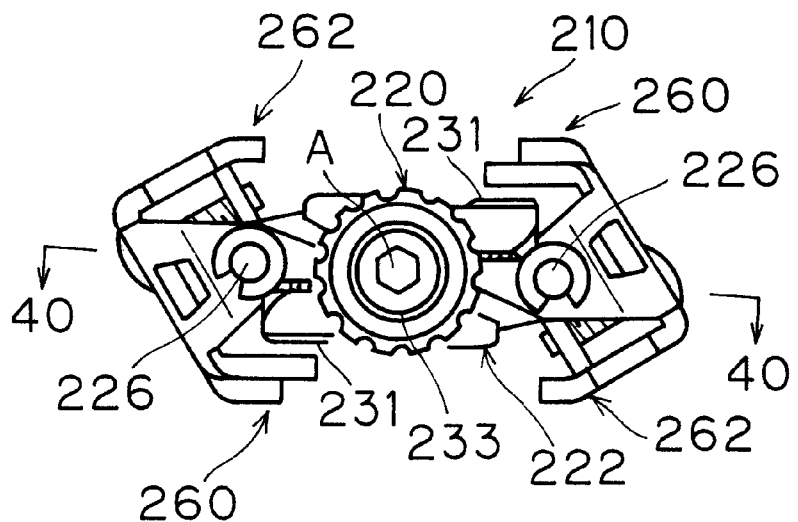
FIG. 37 is an inside elevational view of the left bicycle pedal illustrated in FIGS. 35 and 36 in accordance with the modified embodiment of the present invention.
Figure 38:
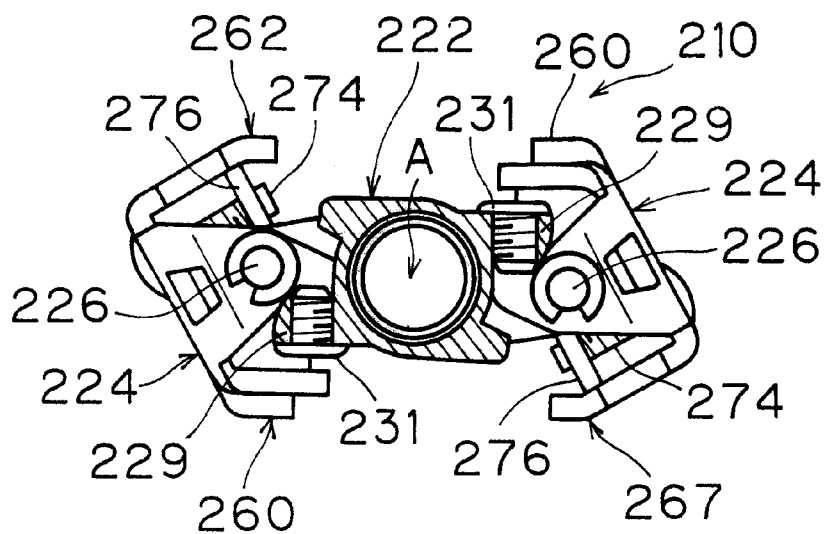
FIG. 38 is a longitudinal cross-sectional view of the left bicycle pedal illustrated in FIG. 35–37 as seen along section line 38—38 of FIG. 35 with the clamping members and the adjustment screws shown in elevation.

As best seen in FIGS. 35 and 37, pedal body 222 is rotatably coupled to pedal shaft 220 for rotation about a center longitudinal axis A of pedal shaft 220. Pedal body 222 has a center longitudinal axis B extending between the front and the rear ends as seen in FIG. 35. Center longitudinal axis B of pedal body 222 extends substantially perpendicular to center longitudinal axis A of pedal shaft 220. A cleat receiving area is formed on each side of pedal body 222 for receiving and supporting cleat 14 thereon. More specifically, cleat receiving area is defined between clamping members 224.

Clamping members 224 selectively engage cleat 14 of bicycle shoe 12 to attach the sole of a bicycle shoe 12 to pedal 210. Clamping members 224 are pivotally coupled to the ends of the pedal body 222 by pivot pins 226. Clamping members 224 are curved in a roughly U-shaped configuration, with its two ends being swingably supported by pivot pins 226 (see FIGS. 36–39) that passes between side portions 238 of pedal body 222. Preferably, clamping members 224 are substantially identical to each other and are similar in construction to the clamping members 24 of the first embodiment. Thus, this aspect of pedal 210 will not be discussed in detail herein.

Each biasing member 228 is preferably formed by a pair of torsion springs, which have their coiled portions mounted on pivot pins 226, one end of each spring engaging a part of pedal body 222. The other end of each spring of biasing member 228 engages a part of tension adjusting mechanism 230 as mentioned below. Biasing members 228 normally urge clamping members 224 to rotate about their respective pivot pins 226 from their cleat releasing positions to their cleat engaging or clamping positions. In other words, biasing members 228 normally maintain clamping members 224 in a cleat engaging position. The retaining forces of biasing members 228 on clamping members 224 are controlled by tension adjusting mechanisms 230.

Referring now to FIGS. 35–38, each of the clamping members 224 includes a connecting portion 250 with a pair of legs 252 extending downwardly from connecting portion 250 for coupling clamping member 224 to pedal body 222 via pivot pins 226. Accordingly, each clamping member 224 is pivotally mounted about its respective pivot pin 226 for movement between a cleat clamping position and a cleat releasing position. Each of the inner legs 252 also has a stop portion or flange 258 which engages the end of screw 231 to limit rotational movement of clamping member 224 via biasing member 228.

Each of the clamping members 224 has a front cleat engagement portion 260 and a rear cleat engagement portion 262. Front cleat engagement portion 260 extends from one side of connecting portion 250, while rear cleat engagement portion 262 extends from the other side of connecting portion 250. Front cleat engagement portion 260 engages the front portion of cleat 14, while a rear cleat engagement portion 262 engages the rear portion of cleat 14. Thus, this aspect of pedal 210 is similar to the first embodiment and will not be discussed in detail herein. Similar to the first embodiment, front cleat engagement portions 260 of each of clamping members 224 has a first cleat engagement surface 264 facing in a first direction and a second cleat engagement surface 266 facing in a second direction which is substantially opposite to the first direction. The front coupling portion 102 is held above pedal body 222 by cleat engagement surfaces 264 and 266, similar to the first embodiment.

Preferably, a minimum clearance of approximately 0.35 mm is created between the tubular member of pedal body 222 and the bottom surface of cleat 14.

First cleat engagement surface 264 is formed by a raised center flange 267 having a curved stop surface 268 for engaging cleat 14 to limit longitudinal movement of cleat 14 relative to pedal body 222. Second cleat engagement surface 266 is formed by a pair of side flanges 269, which are located on opposite sides of the raised center flange 267. First and second cleat engagement surfaces 264 and 266 preferably lie in substantially the same plane, but face in opposite directions. More specifically, first cleat engagement surface 264 faces downwardly away from sole 18 of shoe 12, while second cleat engagement surface 266 faces upwardly toward sole 18 of shoe 12. Thus, first and second cleat engagement surfaces 264 and 266 hold cleat 14 about tubular portion 236 of pedal body 222.

Rear cleat engagement portion 262 has a downwardly facing cleat engagement surface 270, which faces in substantially the same direction as first cleat engagement surface 264 of the front cleat engagement portion 260 of the other clamping member. A curved stop surface 272 is also formed on rear cleat engagement portion 262 for engaging cleat 14 to limit its longitudinal movement relative to pedal body 222, as explained below.

Figure 39:
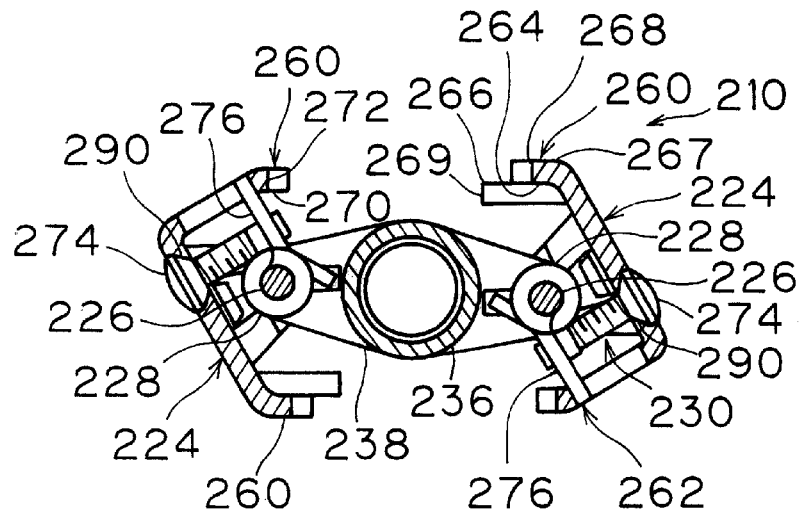
FIG. 39 is a longitudinal cross-sectional view of the left bicycle pedal illustrated in FIG. 35–38 as seen along section line 39—39 of FIG. 35.

Referring to FIG. 39, each of the tension adjustment mechanisms 230 preferably includes an adjustment bolt 274 and an adjusting nut 276. Adjustment bolt 274 is rotatably received in hole 290 of clamping member 224. Moreover, adjusting nut 276 is threaded onto adjustment bolt 274, and has a pair of flanges for engaging one of the ends of springs of biasing member 228. Accordingly, rotation of adjustment bolt 274 causes adjusting nut 276 to move axially along the shaft of adjustment bolt 274. Preferably, clockwise rotation of adjustment bolt 274 causes the spring tension of biasing member or springs 228 on clamping member 224 to increase, while counterclockwise rotation of adjustment bolt 274 causes a decrease in the spring tension of biasing member or springs 228 on clamping member 224. A tab of adjusting nut 276 is located within a slot of clamping member 224. Preferably, adjusting nut 276 is visible through the slot in clamping member 224 such that it acts as a tension indicator for the user to determine the amount of tension being applied by biasing member 228 on clamping member 224. This allows the user to easily adjust a pair of bicycle pedals 210 such that they each have equal spring tension.

In coupling cleat 14 to bicycle pedal 210, the rider steps onto pedal body 222 which in turn causes clamping members 224 to automatically grip on to cleat 14 secured to the sole 18 of the cyclist's shoe 12. Tension adjusting mechanisms 230 can be adjusted to vary the force required for releasing the shoe cleat 14 from the step-in pedal 210. Cleat 14 is coupled to bicycle pedal 210 in substantially the same way as the first embodiment. Thus, the coupling cleat 14 to bicycle pedal 210 will not be discussed in detail herein.

While only main two embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle shoe cleat for releasably coupling a shoe to a bicycle cleat, said bicycle shoe cleat comprising:

an attachment portion having a first end, a second end, an upper sole side facing in a first direction and a lower pedal side facing in a second direction which is substantially opposite to said first direction;

a first coupling member extending from said first end, said first coupling member having a first coupling surface and a second coupling surface that has a portion that is laterally offset from said first coupling surface as viewed in a direction substantially along said second direction, said first coupling surface facing in substantially said first direction and being located between said upper sole side and said lower pedal side, said second coupling surface facing in substantially said second direction and being located between said upper sole side and said lower pedal side; and a second coupling member extending from said second end and having a third coupling surface facing in said first direction.

2. A bicycle shoe cleat according to claim 1, wherein said attachment portion, said first coupling member and said second coupling member are formed as a one-piece, unitary member.

3. A bicycle shoe cleat according to claim 1, wherein said first coupling surface is located further from said attachment portion than said second coupling surface.

4. A bicycle shoe cleat according to claim 1, wherein said second coupling member includes an angled ramp surface.

5. The bicycle shoe cleat according to claim 1, wherein said attachment portion has a hole formed therein.

6. The bicycle shoe cleat according to claim 1, wherein said third coupling surface being divided into two sections by a stop surface substantially perpendicular to said third coupling surface.

7. A bicycle shoe cleat according to claim 1, wherein each of said first and second coupling members has a stop surface extending substantially perpendicular to said first, second and third coupling surfaces.

8. The bicycle shoe cleat according to claim 7, wherein each of said stop surfaces is a curved stop surface.

9. The bicycle shoe cleat according to claim 8, wherein said first coupling surface is a substantially planar surface that curves about said stop surface of said first coupling member.

10. A bicycle shoe cleat according to claim 1, wherein said second coupling surface is formed of two sections, with said first coupling surface being located therebetween.

11. A bicycle shoe cleat according to claim 10, wherein said first and second coupling surfaces lie substantially within a single plane.

12. A bicycle shoe cleat according to claim 10, wherein said first coupling surface is located further from said attachment portion than said second coupling surface.

13. The bicycle shoe cleat according to claim 12, wherein each of said first and second coupling members has a stop surface extending substantially perpendicular to said first, second and third coupling surfaces.

14. The bicycle shoe cleat according to claim 13, wherein each of said stop surfaces is a curved stop surface.

15. The bicycle shoe cleat according to claim 14, wherein said first coupling surface is a substantially planar surface that curves about said curved stop surface of said first coupling member.

16. The bicycle shoe cleat according to claim 15, wherein said second coupling member includes an angled ramp surface.

17. The bicycle shoe cleat according to claim 16, wherein said attachment portion, said first coupling member and said second coupling member are formed as a one-piece, unitary member.

18. The bicycle shoe cleat according to claim 17, wherein said attachment portion has a hole formed therein.

19. The bicycle shoe cleat according to claim 18, wherein said first and second coupling surfaces lie substantially within a single plane.

* * * * *